US005229812A

United States Patent [19]

Toyama et al.

[11] Patent Number: 5,229,812

[45] Date of Patent: Jul. 20, 1993

[54] FINISHER WITH A STAPLER

[75] Inventors: Osamu Toyama, Kobe; Kadotaro Nishimori, Nagoya; Toru Okatani, Kobe; Tatsuya Tanigawa, Toyokawa, all of Japan

[73] Assignee: Minolta Camera Kabushiki Kaisha, Osaka, Japan

[21] Appl. No.: 884,631

[22] Filed: May 15, 1992

[30] Foreign Application Priority Data

May 20, 1991 [JP] Japan .................................. 3-115025

[51] Int. Cl.[5] ........................ G03B 27/48; G03B 27/50

[52] U.S. Cl. ........................................ 355/50; 270/53; 355/324

[58] Field of Search ......................... 355/324, 308, 50; 271/292, 221; 270/37, 53, 58

[56] References Cited

U.S. PATENT DOCUMENTS 4,516,714 5/1985 Braun et al. .......................... 227/78
4,763,167 8/1988 Watanabe et al. .................. 355/324
4,988,029 1/1991 Fiske ........................................ 227/5
5,020,785 6/1991 Kosaka et al. ........................ 270/53
5,099,292 3/1992 Hirose ................................ 355/324
5,106,067 4/1992 Higaki .................................. 270/53

*Primary Examiner*—Richard A. Wintercorn
*Attorney, Agent, or Firm*—Willian Brinks Olds Hofer Gilson & Lione

[57] ABSTRACT

An electric stapler is disposed at the bottom of a tray on which printed sheets are stacked, and is movable along the bottom of the tray. Printed sheets are aligned on the tray along a reference line. The stapler moves along the bottom of the tray and stops at determined points to staple the aligned sheets. A control section is stored with data about the number and location of stapling points proper for each sheet size. The size of printed sheets to be stapled is detected, and the movement of the stapler is controlled so that the stapler can staple at proper points for the detected sheet size.

14 Claims, 18 Drawing Sheets

FINISHER WITH A STAPLER

BACKGROUND OF THE INVENTION

1. Field of the Invention

The present invention relates to a finisher, and more particularly to a finisher which stacks and stores sheets ejected from an image forming apparatus therein and staples the sheets if desired.

2. Description of Related Art

Recently, in the art of electrophotographic copying machine and laser printer, a finisher which staples printed sheets automatically has been developed into various types. Especially desired is one which can staple sheets at one or more points according to an operator'selection.

In one of the conventional types, only A4-sized sheets can be subjected to one-point stapling or two-point stapling selectively, but any other size of sheets are subjected only to one-point stapling. In a sorter/stapling apparatus according to U.S. Pat. No. 4,516,714 issued to Braun et al., the operator can locate some stapling points manually. However, in order to obtain a fine stapled set, the location of stapling points must be carefully done. This is troublesome and difficult for the operator.

SUMMARY OF THE INVENTION

An object of the present invention is to provide a finisher which automatically determines the number of stapling points and the location of the stapling points in accordance with the size of sheets to be stapled.

In order to attain the object, a finisher according to the present invention is to stack sheets ejected from an image forming apparatus on a tray and staple the sheets selectively, and the finisher comprises: means for stapling a stack of sheets on the tray; means for recognizing the size of sheets to be stapled by the stapling means; means for automatically locating one or more stapling points in accordance with the size of sheets recognized by the sheet recognizing means; and means for controlling the stapling means to staple the stack of sheets at the stapling points.

In the structure, sheets ejected from the image forming apparatus are stacked on a tray of the finisher. The stapling point locating means has a memory stored with data about proper location of stapling points for each sheet size. The stapling point locating means compares the sheet size recognized by the sheet recognizing means with the data in the memory and determines location of stapling points.

Thus, without an operator's location of stapling points, sheets of any size can be automatically stapled at proper points.

BRIEF DESCRIPTION OF THE DRAWINGS

This and other objects and features of the present invention will be apparent from the following description with reference to the accompanying drawings in which.

DETAILED DESCRIPTION OF THE PREFERRED EMBODIMENTS

The following describes an image forming apparatus employing an exemplary finisher according to the present invention.

Figure 1:
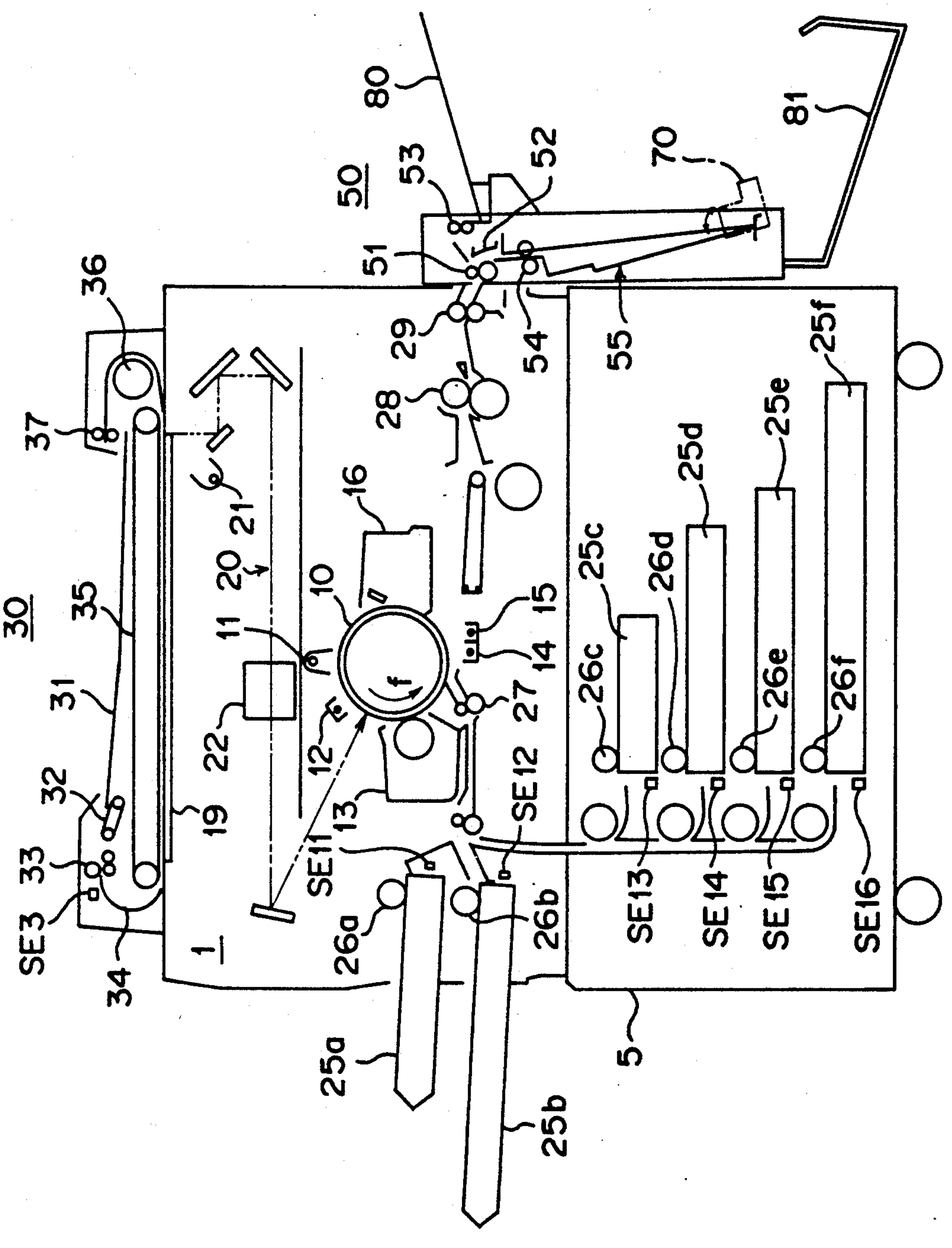
FIG. 1 is a schematic view of a copying machine provided with a finisher unit according to the present invention.

Referring to FIG. 1, a copying machine body 1 is mounted on a desk 5. A recirculating type of automatic document feeder (hereinafter referred to as ADF) 30 is disposed on the body 1, and a finisher unit 50 for binding printed sheets is disposed at the right side of the body 1.

Copying Machine Body

A photosensitive drum 10 which is rotated in a direction of arrow f is disposed in the center of the copying machine body 1. Around the photosensitive drum 10 are an eraser lamp 11, an electric charger 12, a magnetic brush type developing device 13, a transfer charger 14, a sheet separation charger 15, a blade type residual toner cleaning device 16. The constitution and operation of these image forming elements are conventional, and the description is omitted.

An optical system 20 comprises an exposure lamp 21, an imaging lens system 22, various mirrors, and a driving device for moving the lamp 21 and the mirrors in accordance with the selected copying magnification.

Copy sheets are stored in automatic feed cassettes 25*a* and 25*b* installed in the body 1 and 25*c*, 25*d*, 25*e* and 25*f* installed in the desk 5. Feed rollers 26*a*, 26*b*, 26*c*, 26*d*, 26*e* and 26*f* are provided in the cassettes 25*a*, 25*b*, 25*c*, 25*d*, 25*e* and 25*f* respectively to feed the copy sheets out thereof one by one. Each fed sheet is transported to a transfer section by timing rollers 27 in synchronization with an image formed on the photosensitive drum 10. After image transfer from the photosensitive drum 10 to the sheet, the sheet is fed to a fixing device 28 where the image is fixed on the sheet. Then, the sheet is ejected from the body 1 by ejection rollers 29. Sheet size detection sensors SE11, SE12, SE13, SE14, SE15, SE16 are disposed at the fitting positions of the cassettes 25*a*, 25*b*, 25*c*, 25*d*, 25*e* and 25*f* respectively. The sensors SE11 through SE16 decode projections or magnets provided on the cassettes 25*a* through 25*f* to recognize the sizes (including longitudinal feed position or lateral feed position) of sheets stored in the respective cassettes.

Automatic Document Feeder

The ADF 30 is mainly composed of a document tray 31, a feed belt 32, feed rollers 33, a reversing guide plate 34, a conveyer belt 35, a reversing roller 36 and ejection rollers 37. A sensor SE3 for detecting the size of a document is provided in the document passage. The ADF 30 recirculates documents placed on the tray 31 one after another. A set of documents should be placed on the tray 31 such that the last page is laid at the bottom of the set with its imaged side facing up, and feeding starts with the last page. The lowermost document on the tray 31 is drawn therefrom with rotation of the feed belt 32 and fed between the conveyer belt 35 and a document glass 19 via the feed rollers 33 and the reversing guide plate 34. The document is set in a specified position with rotation of the conveyer belt 35 and irradiated by the optical system 20. Thereafter, the document is transported in the right in FIG. 1 and reversed by the reversing roller 36. Then, the document is ejected on the remaining documents placed on the tray 31 by the ejection rollers 37 with its imaged side facing up.

The sensor SE3 detects the size (including longitudinal feed position or lateral feed position) of each document fed from the tray 31.

The ADF 30 can pivot upward on the rear side of the body 1, and while the copying machine is operating in a mode wherein an operator sets documents on the document glass 19 manually, the ADF 30 functions as a document cover.

Finisher Unit

Figure 2:
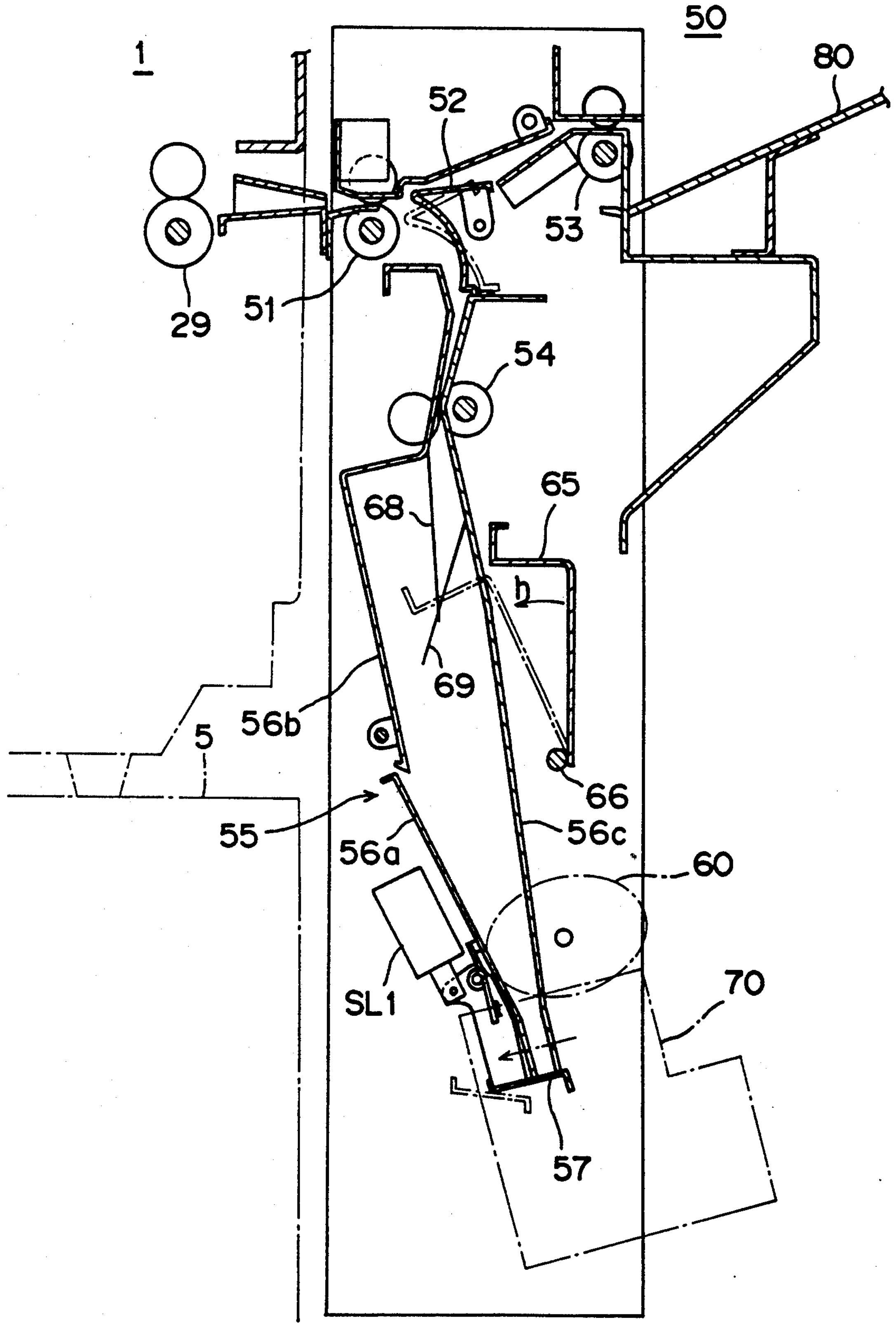
FIG. 2 is an elevational view in section of the finisher unit.
Figure 3:
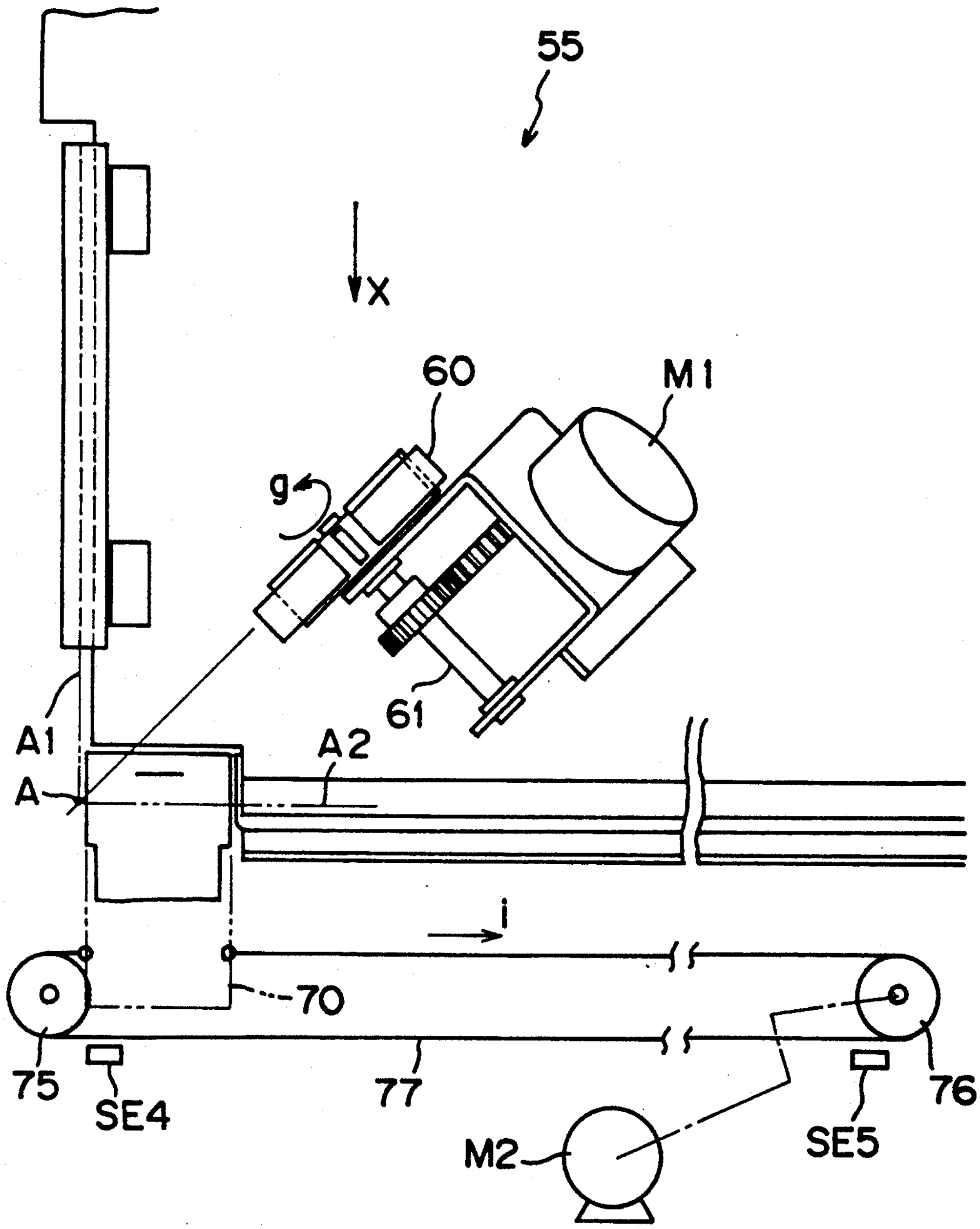
FIG. 3 is a side view of an essential part of a staple tray in the finisher unit.
Figure 4A:
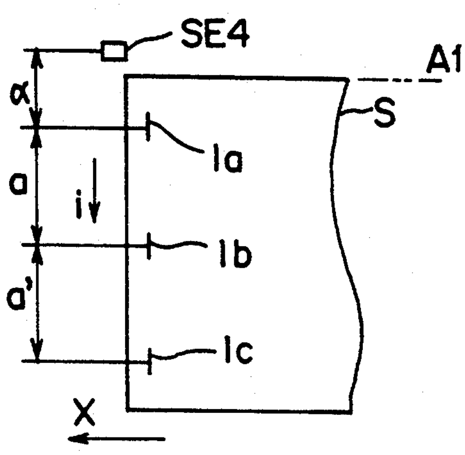
FIGS. 4*a* through 4*e* are explanatory views showing proper location of stapling points for each copy sheet size.
Figure 4B:
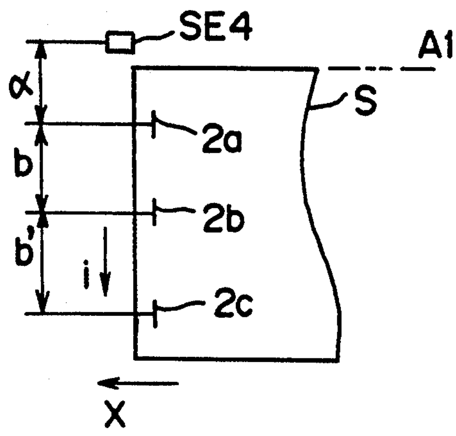
Figure 4C:
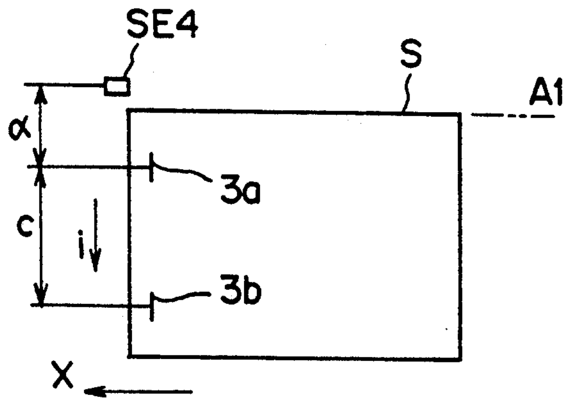
Figure 4D:
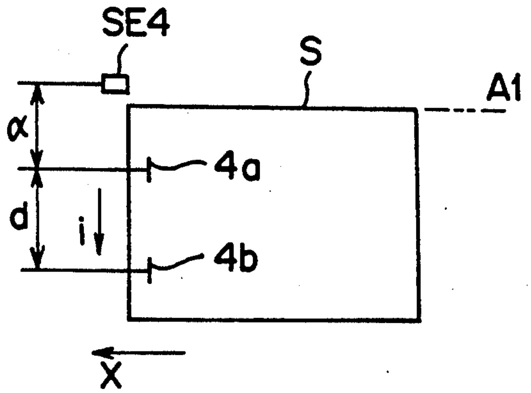
Figure 4E:
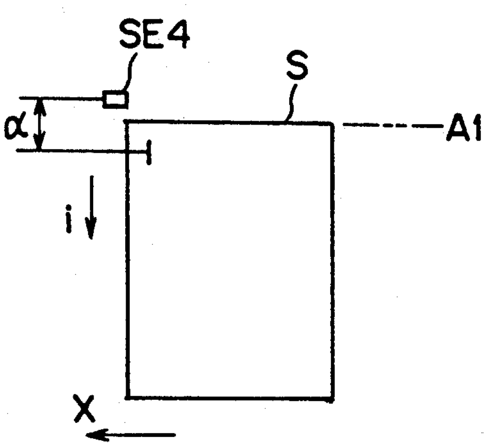

Next, referring to FIGS. 2 and 3, the finisher unit 50 is described.

The finisher unit 50 operates in a non-stapling mode and in some kinds of stapling modes. In the non-stapling mode, the finisher unit 50 stacks printed sheets on a tray 80. In the stapling modes, the finisher unit 50 stacks printed sheets on a staple tray 55, aligns the sheets thereon and staples the sheets with an electric stapler 70. A diverter 51 is moved by a solenoid so as to make a sheet path according to the operating mode. In the non-stapling mode, the diverter 51 is set in a position shown by the dashed line. Each printed sheet is received by rollers 51, guided by an upper surface of the diverter 52 and ejected onto the tray through rollers 53. In the stapling modes, the diverter 51 is set in a position shown by the solid line. Each printed sheet is received by the rollers 51, guided downward by a side of the diverter 51 and fed to the staple tray 55 through rollers 54.

The staple tray 55 comprises a base plate **56*a*, guide plates 56*b* and 56*c*, and a stopper 57. The stopper 57 is connected with a solenoid SL1, and while the solenoid SL1 is off, the stopper 57 closes the bottom of the staple tray 55 to regulate the lower edges of the sheets stored therein. When the solenoid SL1 is turned on, the stopper 57 opens the bottom of the staple tray 57 to drop the sheets into a box 81**.

A paddle wheel 60 is fitted to the guide plate **56*c* so as to align the sheets in the staple tray 55. As shown in FIG. 3, the paddle wheel 60 has several blades radiating from a shaft 61 and is rotated in a direction indicated by arrow g by a motor M1. The sheets are fed to the staple tray 55 in a direction indicated by arrow X one by one. The paddle wheel 60** is rotated in the direction of arrow g and urged toward a corner A, and the sheets are aligned along reference lines A1 and A2.

The staple tray 55 is further provided with a sheet pressing plate 65. The pressing plate 65 is connected with a solenoid (not shown) and is capable of pivoting on a shaft 66 such that it can advance to and retreat from the staple tray 55. Each time a sheet comes into the tray 55, the pressing plate 65 pivots in a direction indicated by arrow h and advances to the tray 55 so as to press the sheet on the upper portion against the guide plate **56*b*. The pressing plate 65 retreats from the tray 55 immediately before the next sheet comes into the tray 55. Thus, the pressing plate 65 prevents the upper portion of the sheet from bending toward the guide plate 56*c*. With this arrangement, a collision of sheets, which may cause sheet jamming and page disorder, can be prevented. Additionally, in order to secure the prevention of the collision of sheets, a resin sheet 68 and an electrostatic neutralizing brush 79 are provided in the tray 55**.

The stapler 70 is a conventional electric type which contains many staples and is connected with a wire 77 laid between pulleys 75 and 76. The pulley 76 is connected with a reversible motor M2. In the structure, the stapler 70 moves along the bottom of the staple tray 55, in a direction indicated by arrow i with forward rotation of the motor M2 and in a direction reverse to arrow i with reverse rotation of the motor M2. Sensors SE4 and SE5 for detecting the stapler 70 are disposed near the pulleys 75 and 76 respectively. The sensor SE4 is to detect whether the stapler 70 is in a home position, and the sensor SE5 is to detect whether the stapler 70 reaches a terminal position.

The stapler 70 is moved to a specified position by rotating the motor M2 for a time corresponding to the distance from the stapler 70 to the specified position. The stapler 70 is stopped at the specified position and is turned on to staple the sheets. In this way, the sheets can be stapled at one or more specified points. The position(s) where the stapler 70 is stopped, that is, the stapling point(s) can be predetermined according to the size of sheets to be stapled, and it is possible that the finisher 50 automatically staples at one or more points according to the size of sheets.

Location of Stapling Points

Now referring to FIGS. **4*a* through 4*e***, proper location of stapling points for each sheet size is described.

In this embodiment, multiple stapling (stapling sheets at a plurality of points) is possible to A3-longitudinal, A4-lateral, B4-longitudinal, A4-longitudinal and B5-longitudinal sheets. "Longitudinal" means that sheets are transported to the tray 55 with their longitudinal sides parallel with the traveling direction X, and this is denoted by "T" in the drawings. "Latitudinal" means that sheets are transported to the tray 55 with their longitudinal sides perpendicular to the traveling direction X, and this is denoted by "Y" in the drawings. Single stapling (stapling sheets at one point) is possible to any size of sheets. In FIGS. **4*a* through 4*e*, the upper side of each sheet S is along the reference line A1, and the stapler 70 moves up and down as shown by arrow i. Multiple stapling to A3-longitudinal or A4-lateral sheets (A3-longitudinal/A4-lateral multiple stapling mode) is stapling at three points 1*a*, 1*b* and 1*c* with intervals a and a' (a=a'). Multiple stapling to B4-longitudinal or B5-lateral sheets (B4-longitudinal/B5-lateral multiple stapling mode) is stapling at three points 2*a*, 2*b* and 2*c*** with intervals b and b' (b=b'). Multiple stapling to A4-longitudinal sheets (A4-longitudinal multiple stapling mode) is stapling at two points 3*a* and 3*b* with an interval c. Multiple stapling to B5 longitudinal sheets (B5-longitudinal multiple stapling mode) is stapling at two points 4*a* and 4*b* with an interval d.

The stapler 70 can be moved to each stapling point by controlling the rotating period of the motor M2. The intervals a, b, c and d are predetermined so as to be proper for the respective sheet sizes. The interval $\alpha$ between the home position of the stapler 70 and a first stapling point varies according to the sheet size. These intervals may be designed to any values.

The size of sheets to be stapled is recognized from an operator's selection by use of an operation panel or from an APS control (control for automatically selecting a copy sheet size in accordance with the size of a document and the copying magnification) based on the detection of the document size by use of the sensor SE3 in the ADF 30, and the recognized sheet size is inputted in a control section which will be described later. In accordance with the inputted data, the stapler 70 is controlled to move with the intervals $\alpha$ and a, b, c or d.

In the control section, the stapling modes in accordance with the respective sheet sizes are represented by code numbers of three figures as shown by Table 1.

TABLE 1

| stapling mode | code |
|---|---|
| non-stapling mode | 000 |
| single stapling mode (one-point stapling) | 001 |
| A3-lonitudinal/A4-lateral multiple stapling mode (three-point stapling) | 100 |
| B4-lonitudinal/B5-lateral multiple stapling mode (three-point stapling) | 101 |
| A4-lonitudinal multiple stapling mode (two-point stapling) | 110 |
| B5-lonitudinal multiple stapling mode (two-point stapling) | 111 |

Operation Panel

Figure 5:
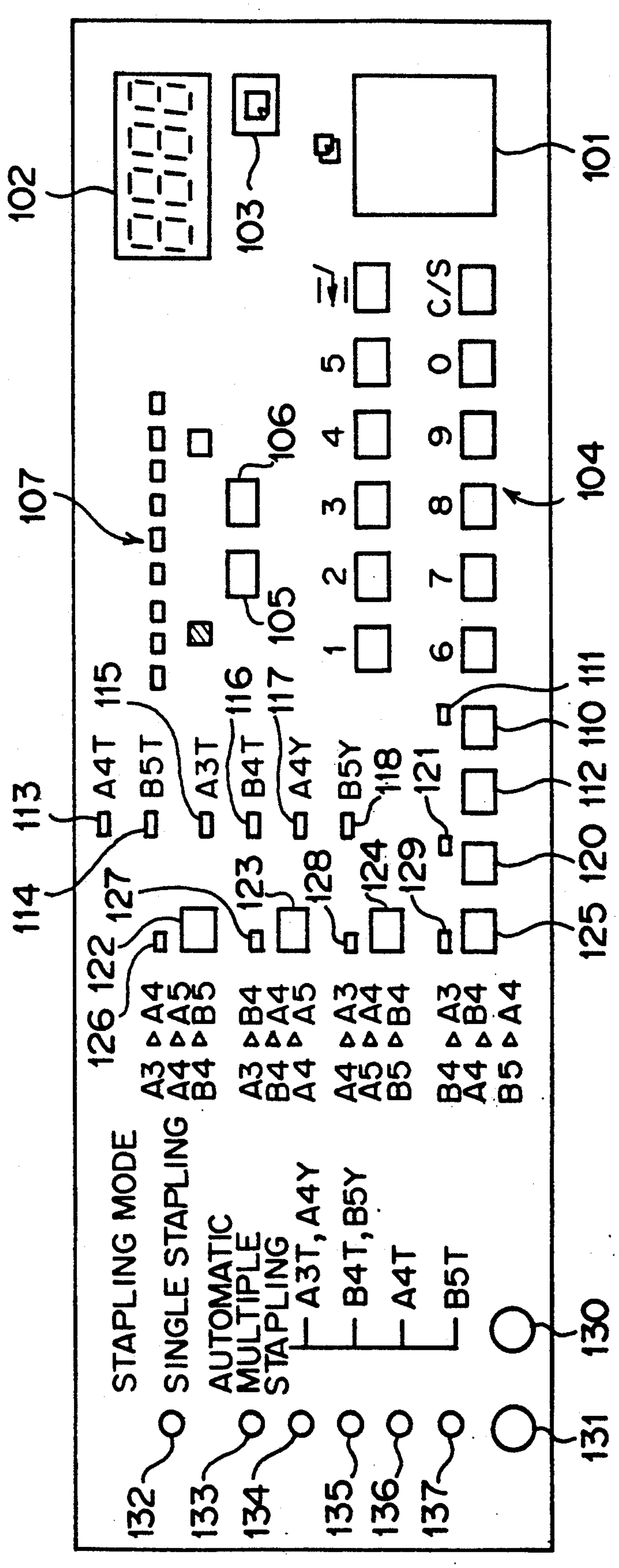
FIG. 5 is a plan view of an operation panel.

Next, referring to FIG. 5, an operation panel 100 disposed on the body 1 is described.

The operation panel 100 comprises keys and indicators as shown in FIG. 5, in which:

Numeral 101 denotes a copy start key to start copying;

Numeral 102 denotes a seven-segment indicator which can display from single figures up to four figures to indicate the number of copy sets to be made;

Numeral 103 denotes an indicator which indicates that no copy sheets are in the selected cassette;

Numeral 104 denotes a ten-key;

Numeral 105 denotes a copying density up key;

Numeral 106 denotes a copying density down key;

Numeral 107 denotes LEDs which indicate the copying density;

Numeral 110 denotes an APS mode (automatic paper selection mode) selection key;

Numeral 111 is an LED which indicates that the APS mode is selected;

Numeral 112 is a copy sheet selection key;

Numerals 113, 114, 115, 116, 117 and 118 denote LEDs which indicate the size of selected copy sheets;

Numeral 120 denotes a full-size copying selection key;

Numeral 121 denotes an LED which indicates that the full-size copying is selected;

Numerals 122, 123, 124 and 125 denote a copying magnification selection key;

Numerals 126, 127, 128 and 129 denote LEDs which indicate the selected copying magnification;

Numeral 130 denotes a staple start key to start stapling;

Numeral 131 denotes a stapling mode selection key;

Numeral 132 denotes an LED which indicates that the single stapling mode is selected;

Numeral 133 denotes an LED which indicates that the automatic multiple stapling mode is selected;

Numeral 134 denotes an LED which indicates the A3-longitudinal/A4-lateral multiple stapling mode is selected;

Numeral 135 denotes an LED which indicates the B4-longitudinal/B5-lateral multiple stapling mode is selected;

Numeral 136 denotes an LED which indicates the A4-longitudinal multiple stapling mode is selected; and Numeral 137 denotes an LED which indicates the B5-longitudinal multiple stapling mode is selected.

Here, selection of a stapling mode is described in more detail. Under an initial state when the body 1 is turned on, the LEDs 132 through 137 are off, and the non-stapling mode is selected. When the operator presses the stapling mode selection key 131 once, the LED 132 is lit and the single stapling mode is selected. Thereafter, every time the operator presses the key 131, the LEDs 133 through 137 are lit in order and the respective stapling mode is selected. After lighting of the LED 137, when the key 131 is pressed, the LED 137 is turned off and the stapling mode is canceled, that is, the non-stapling mode is selected. If the automatic multiple stapling mode and the APS mode are selected, one of the multiple stapling modes is selected in accordance with the copy sheet size determined by the APS control, and stapling is started automatically upon the completion of one cycle of copying.

Unless the APS mode is selected, stapling is not started until the operator presses the staple start key 130.

A control procedure for the operation will be described in detail later with reference to flowcharts.

Control Circuit

Figure 6:
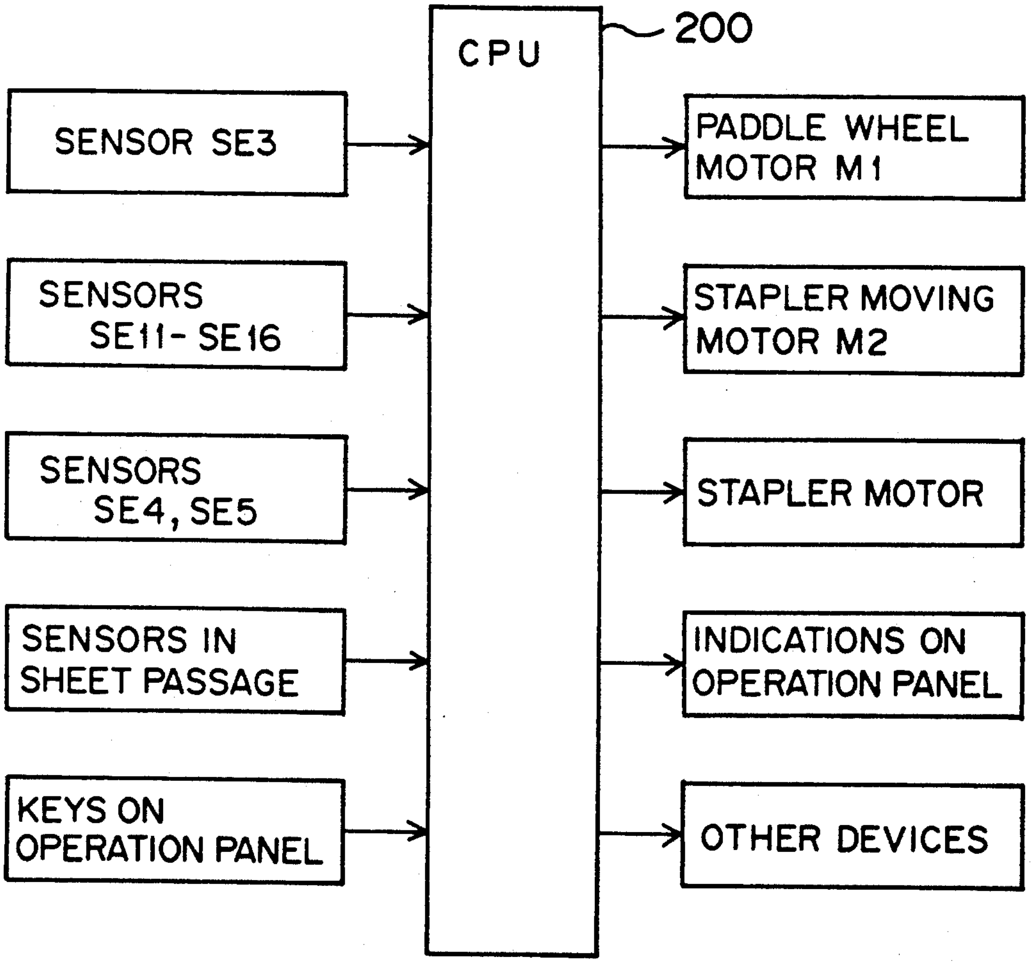
FIG. 6 is a block diagram of a control circuit of the copying machine.

FIG. 6 shows the input/output organization of a CPU 200 which controls the copying machine body 1, the ADF 30 and the finisher unit 50.

The CPU 200 receives signals from the document size sensor SE3, the copy sheet size sensors SE11 through SE16, the stapler sensors SE4 and SE5, all the keys on the operation panel 100 and all the sensors provided in the sheet passage.

The CPU 200 sends signals to the paddle wheel motor M1, the stapler moving motor M2 (which changes the position of the stapler 70), a staple motor (which have the stapler 70 staple) and all the indicators on the operation panel 100.

Control Procedure

A control procedure of the copying machine body 1, the ADF 30 and the finisher 50 is hereinafter described with reference to flowcharts shown in FIGS. 7 through 18.

Figure 7:
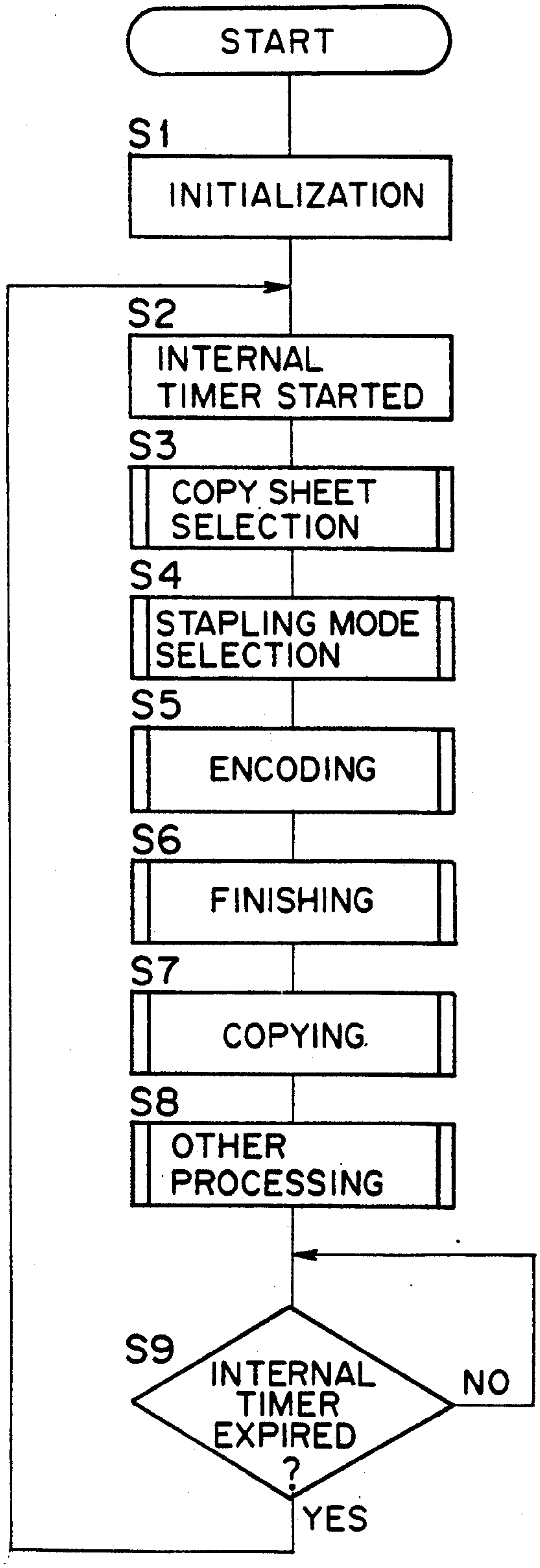
FIG. 7 is a flowchart showing a main routine of a microcomputer of the control circuit.

FIG. 7 shows a main routine of the CPU 200.

When the power is turned on, the CPU 200 is reset and the program starts. At step S1, a RAM of the CPU 200 is cleared, and every register is initialized. At step S2, an internal timer is started. The internal timer determines a time required for one cycle of this routine, and timers in subroutines are set based on the time set in the internal timer.

At steps S3 through S8, the subroutines are called in order for necessary processing. Upon confirmation of the expiration of the internal timer at step S9, the processing returns to step S2.

Step S3 is to select copy sheets (select one of the feed cassettes 25a through 25f). Step S4 is to select a stapling mode. Step S5 is to encode the selected stapling mode. Step S6 is to carry out finishing by driving the stapling moving motor M2 and the staple motor. Step S7 is to carry out copying in the copying machine body 1. Step S8 is to detect and treat sheet jamming, to control the temperature of the fixing device, etc.

Figure 8:
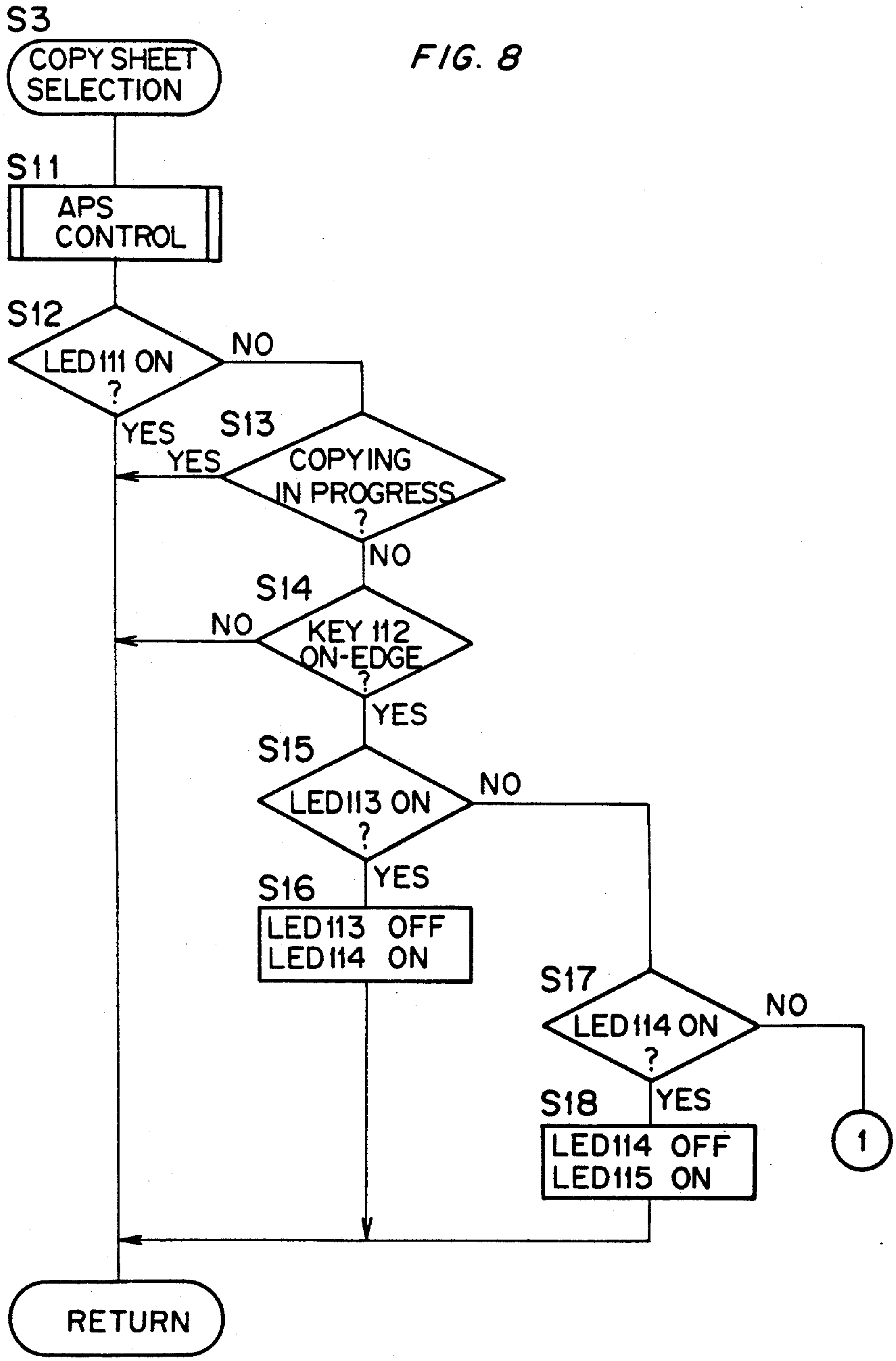
FIGS. 8 and 9 are flowcharts showing a subroutine for selecting copy sheets.
Figure 9:
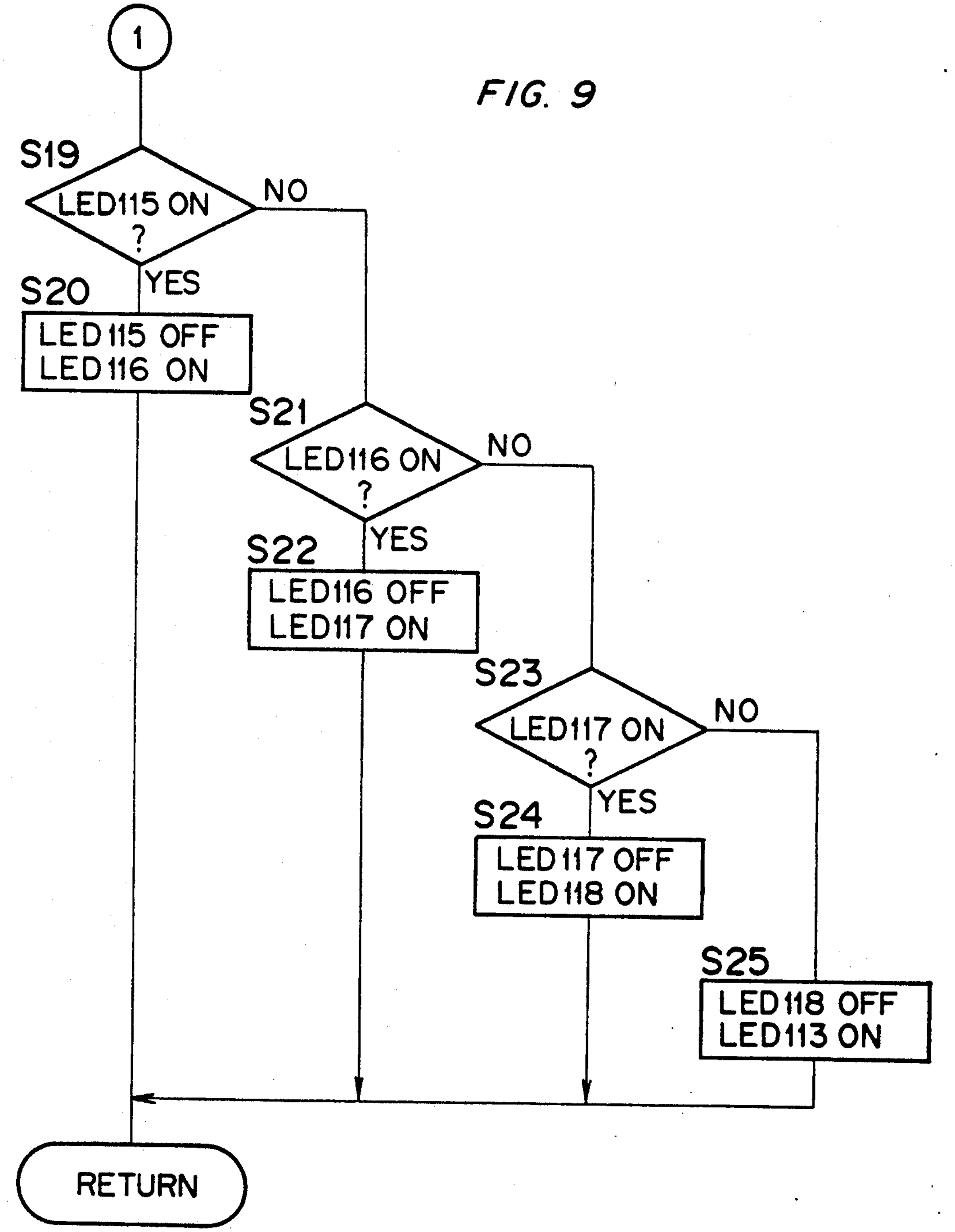

FIGS. 8 and 9 show a copy sheet selection subroutine which is called at step S3 in the main routine.

An APS control is carried out at step S11. The APS control is to automatically determine a copy sheet size in accordance with the size of a document and the copying magnification, and it will be described later with reference to FIG. 10.

The LED 111 is checked at step S12. When the APS mode, wherein copying is carried out using the ADF 30, is selected, the LED 111 is turned on. If the APS mode is selected and the LED 111 is on ("YES" at step S12), the copy sheet size will be determined automatically. Therefore this subroutine is terminated immediately.

If the LED 111 is off ("NO" at step S12), whether copying is in progress is judged at step S13. If the copying is not in progress, whether the sheet selection key 112 is on-edge is judged at step S14. If the key 112 is not on-edge, this subroutine is immediately terminated. If the key 112 is on-edge, whether the LEDs 113, 114, 115, 116 and 117 are checked at steps S15, S17, S19, S21 and S23 respectively. For example, if the LED 113 is on ("YES" at step S15), which means that A4-longitudinal has been selected as the copy sheet size, the LED 113 is turned off and the LED 114 which is disposed immediately under the LED 113 is turned on at step S16 so that B5-longitudinal is newly selected. If the LED 114 is on ("YES" at step S17), which means that B5-longitudinal has been selected as the copy sheet size, the LED 114 is turned off and the LED 115 which is disposed immediately under the LED 114 is turned on at step S18 so that A3-longitudinal is newly selected. In this way, each time the copy sheet selection key 112 is pressed, the copy sheet sizes indicated on the operation panel 100 are selected in order from the top to the bottom. Next to B5-lateral which is indicated at the bottom, A4-longitudinal which is indicated at the top is selected (see steps S23 and S25). The CPU 200 is usually set such that A4-longitudinal indicated at the top on the operation panel 100 is selected upon the initialization at step S1. However, it is possible to change the setting of the CPU 200 so that any other sheet size is selected upon the initialization.

Figure 10:
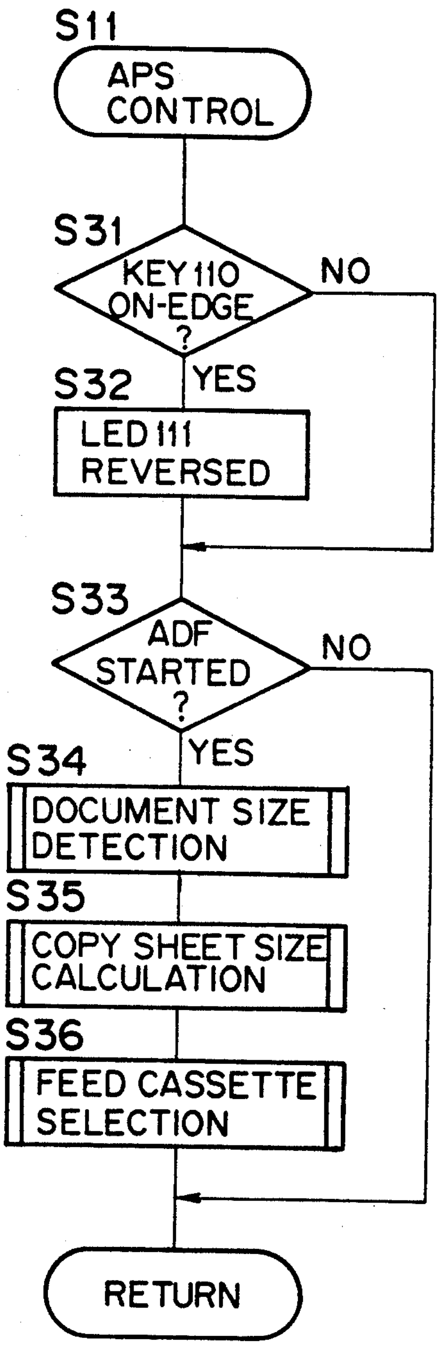
FIG. 10 is a flowchart showing a subroutine for performing APS (automatic paper selection) control.

FIG. 10 shows an APS control subroutine which is called at step S11 in the main routine.

First, the APS mode selection key 110 is checked at step S31. If the key 110 is on-edge, the LED 111 is turned to a reverse state. The LED 111 is initialized to be off. Thereafter, when the key 110 is pressed once, the LED 111 is turned on (selection of the APS mode), and the key 110 is pressed again, the LED 111 is turned off (cancellation of the APS mode).

When it is confirmed at step S33 that an ADF start signal is generated, the size of a document is detected with the sensor SE3 at step S34. A copy sheet size is calculated at step S35 from the size of the original document and the copying magnification. For example, if the original document is A3 longitudinal and the copying magnification is 0.707, A4 longitudinal is selected as the copy sheet size. A feed cassette which contains sheets of the selected size is designated at step S36. Then, this subroutine is completed.

Figure 11:
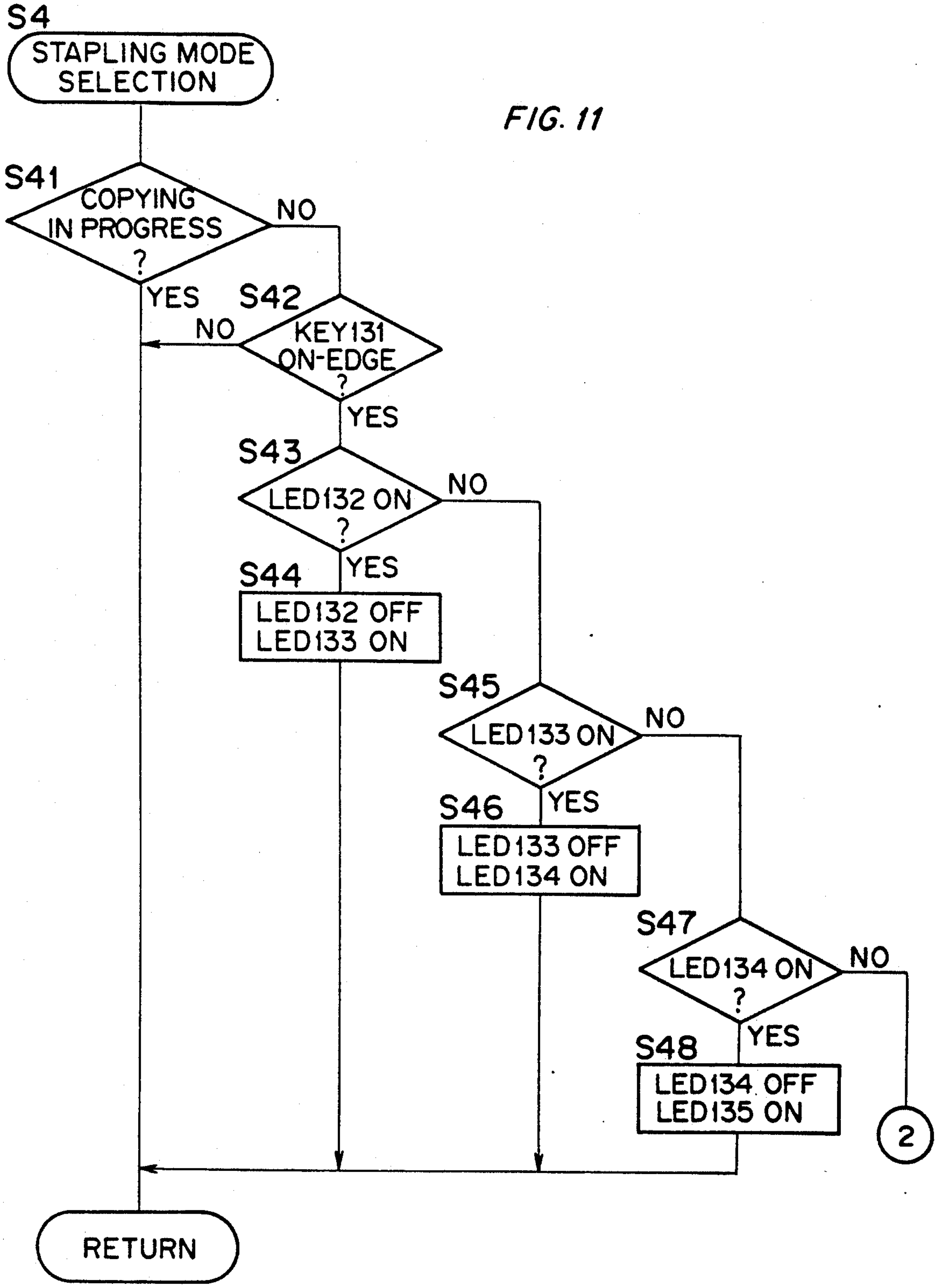
FIGS. 11 and 12 are flowcharts showing a subroutine for selecting a stapling mode.
Figure 12:
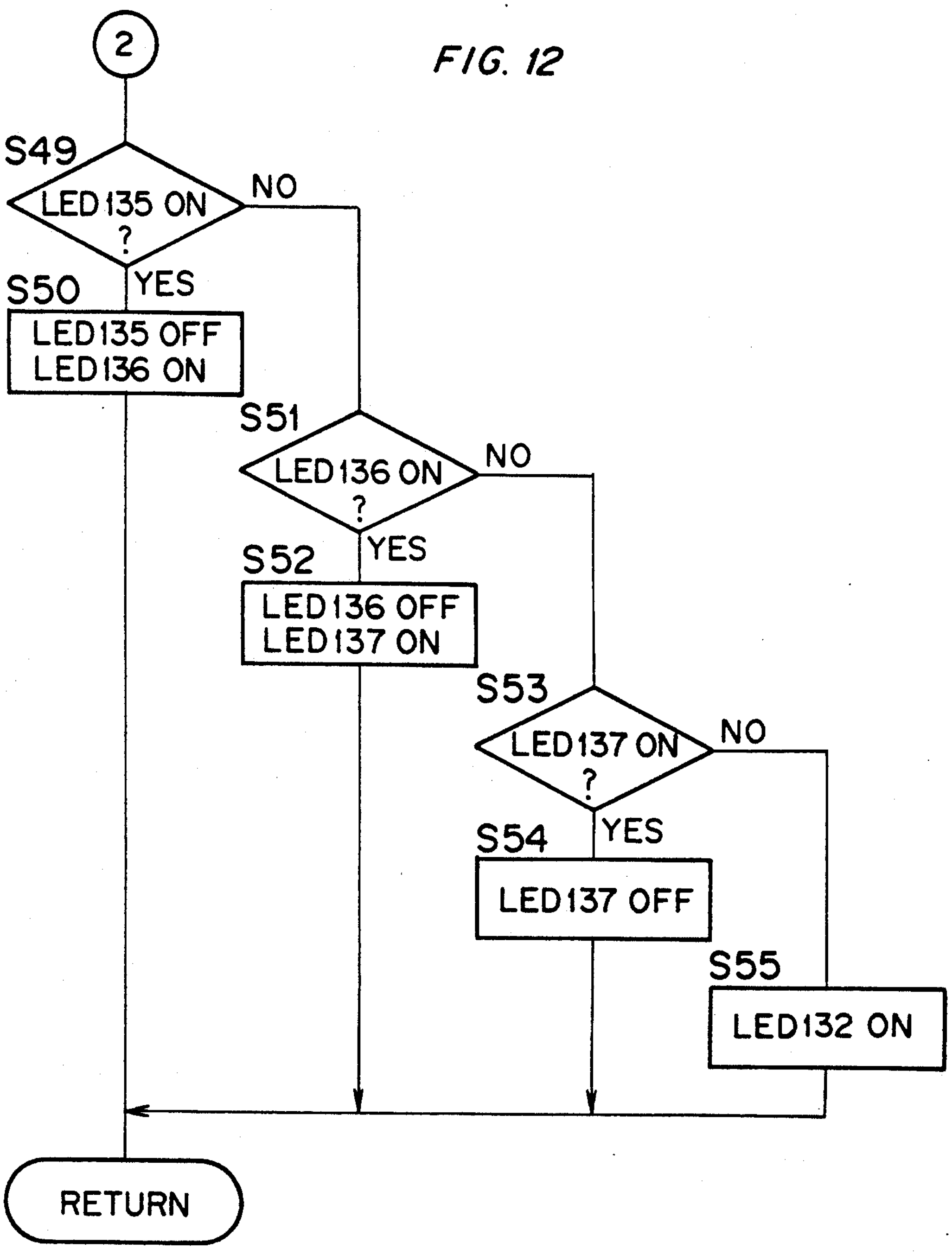

FIGS. 11 and 12 show a stapling mode selection subroutine which is called at step S4 in the main routine.

First, it is judged at step S41 whether copying is in progress. If copying is in progress, this subroutine is immediately terminated. If copying is not in progress, selection of a stapling mode is started.

The stapling mode selection key 131 is checked at step S42. If the key 131 is not on-edge, this subroutine is terminated. If the key 131 is on-edge, the LEDs 132, 133, 134, 135, 136 and 137 are checked at steps S43, S45, S47, S49, S51 and S53 respectively. The selection of a stapling mode is made in the same manner as the selection of a copy sheet size. Each time the stapling mode selection key 131 is pressed, the object of the selection moves among the modes indicated on the operation panel 100 in order from the top to the bottom. Upon the initialization at step S1, the LEDs 132 through 137 are turned off, that is, the non-stapling mode is selected. Then, when the key 131 is pressed once, judgements at steps S43, S45, S47, S49, S51 and S53 are all "NO", and the LED 132 is turned on at step S55 so that the single stapling mode is newly selected. Thereafter, each time the key 131 is pressed, the object of the stapling mode selection moves downward among the modes indicated on the operation panel 100. After selection of the B5-longitudinal stapling mode (lighting of the LED 137), when the key 131 is pressed ("YES" at step S53), the LED 137 is turned off at step S54 so that the non-stapling mode is newly selected.

Figure 13:
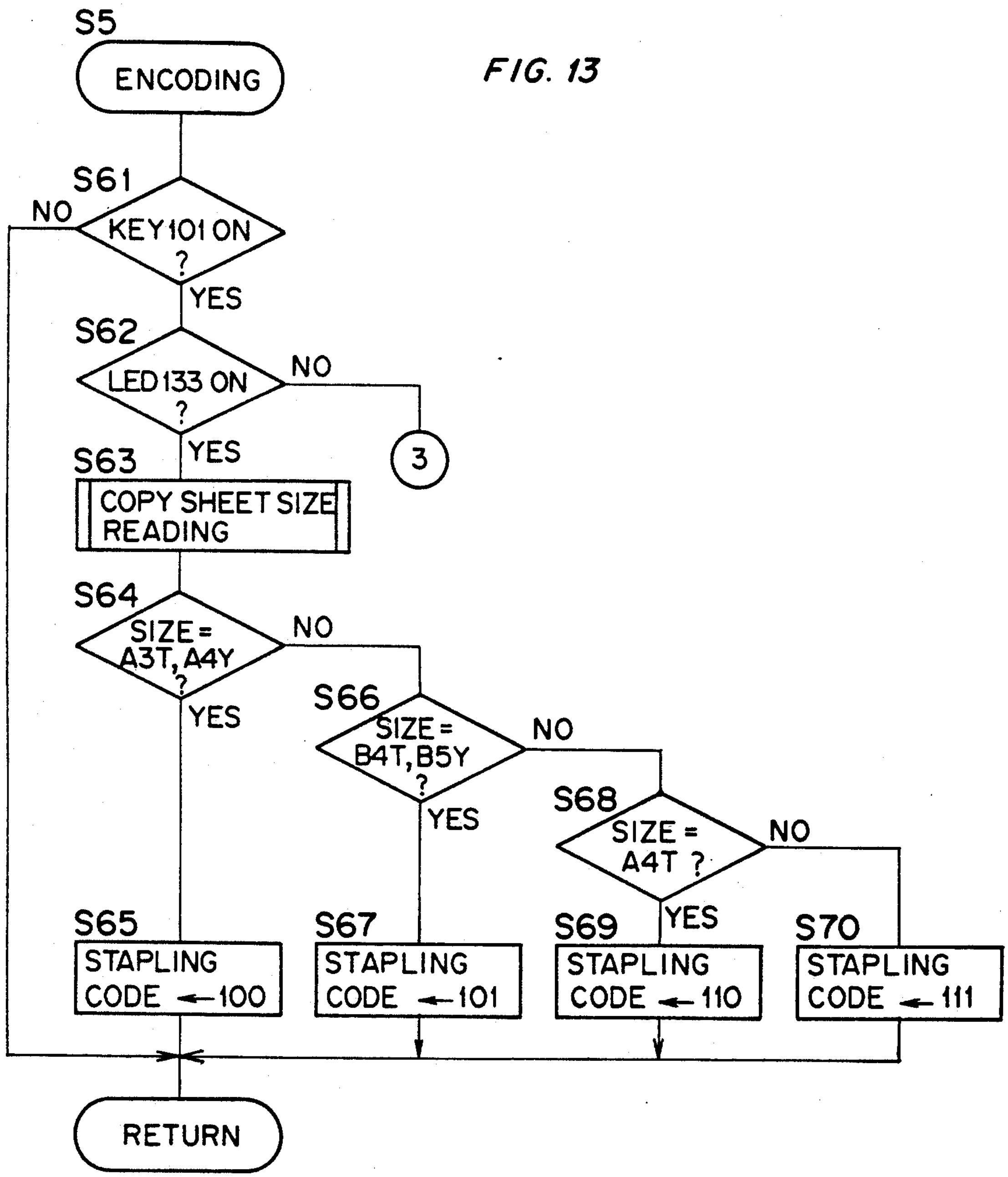
FIGS. 13 and 14 are flowcharts showing a subroutine for encoding a selected stapling mode.
Figure 14:
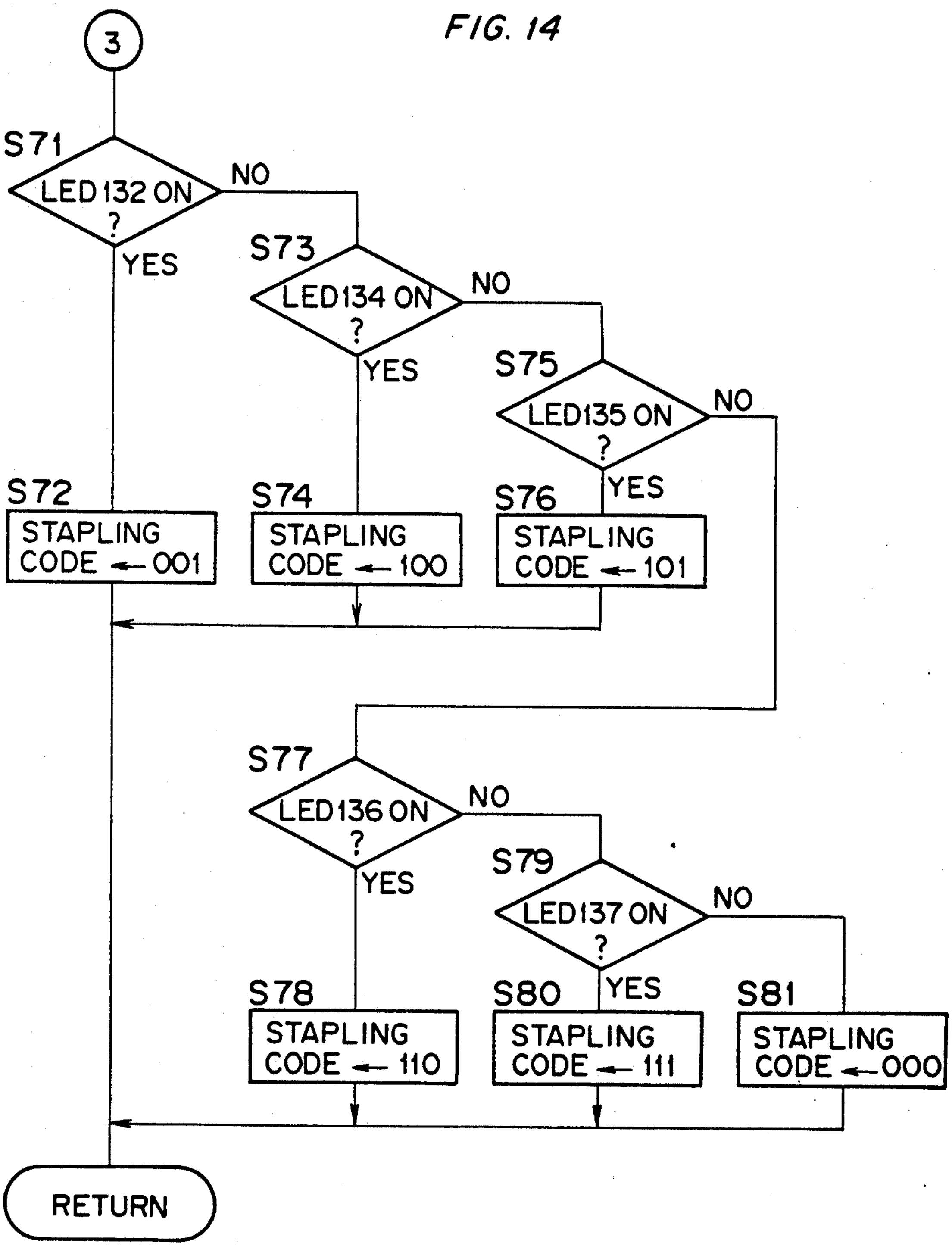

FIGS. 13 and 14 show an encoding subroutine which is called at step S5.

First, the copy start key 101 is checked at step S61. If the key 101 is on and copying has started, the LED 133 is checked at step S62. If the LED 133 is on, which means that the automatic multiple stapling mode has been selected, an access to the APS control or the manual copy sheet selection is made at step S63 to read the copy sheet size. If the APS mode has been selected, the sheet size calculated in the APS control subroutine (see FIG. 10) is read. If the APS mode has not been selected, the copy sheet size selected manually using the copy sheet selection key 112 is read.

Subsequently, the read sheet size is recognized at step S64, S66 or S68 and is encoded at step S65, S67, S69 or S70. The encoding is made according to Table 1.

If the automatic multiple stapling mode has not been selected ("NO" at step S62), the LEDs 132, 134, 135, 136 and 137 are checked at steps S71, S73, S75, S77 and S79 respectively. When one of the LEDs is judged to be on, the corresponding stapling mode is encoded according to Table 1 at step S72, S74, S76, S78 or S80. If none of the LEDs is judged to be on, the non-stapling mode is encoded at step S81.

Figure 15:
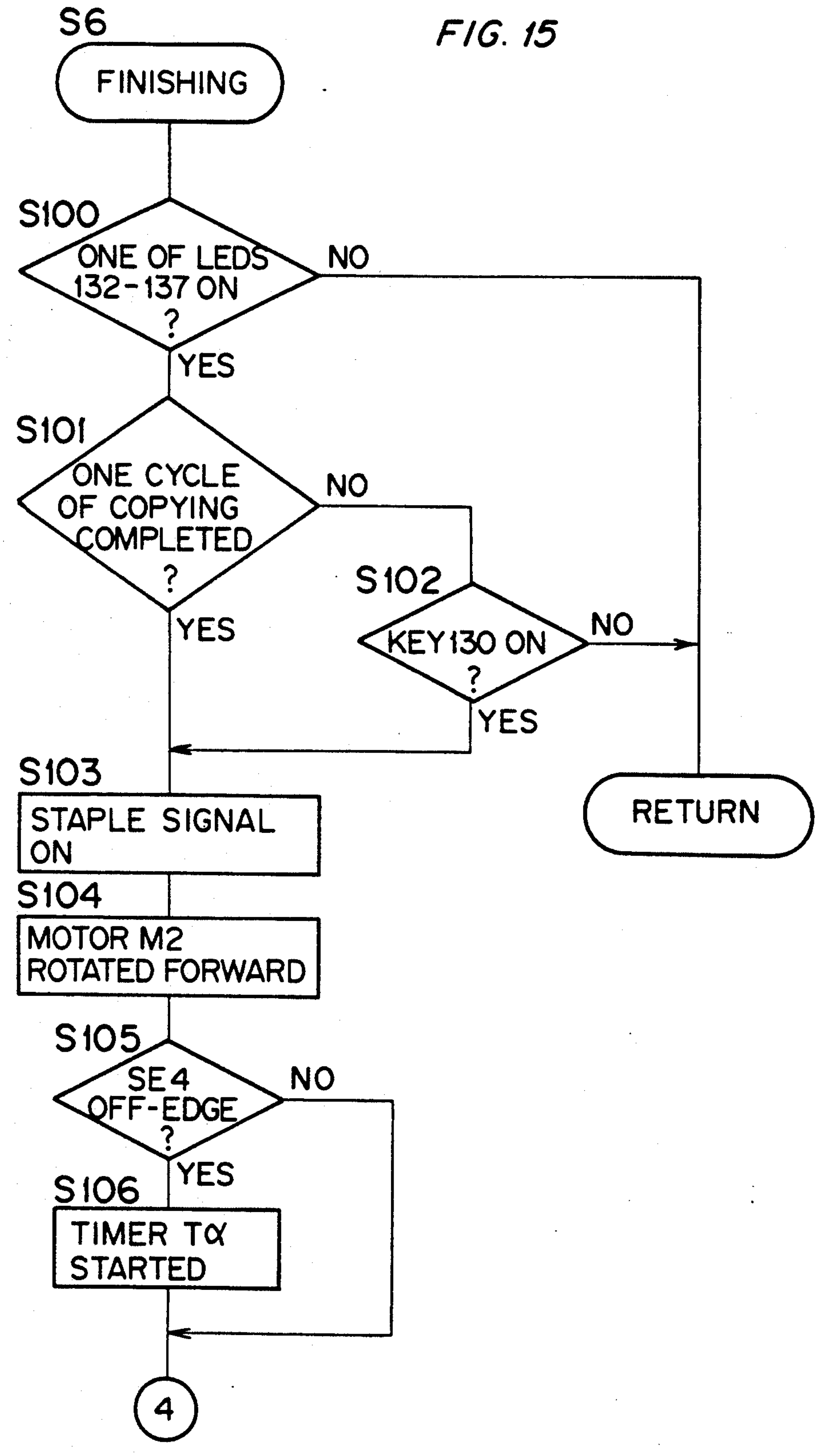
FIGS. 15, 16 and 17 are flowcharts showing a subroutine for performing finishing.
Figure 16:
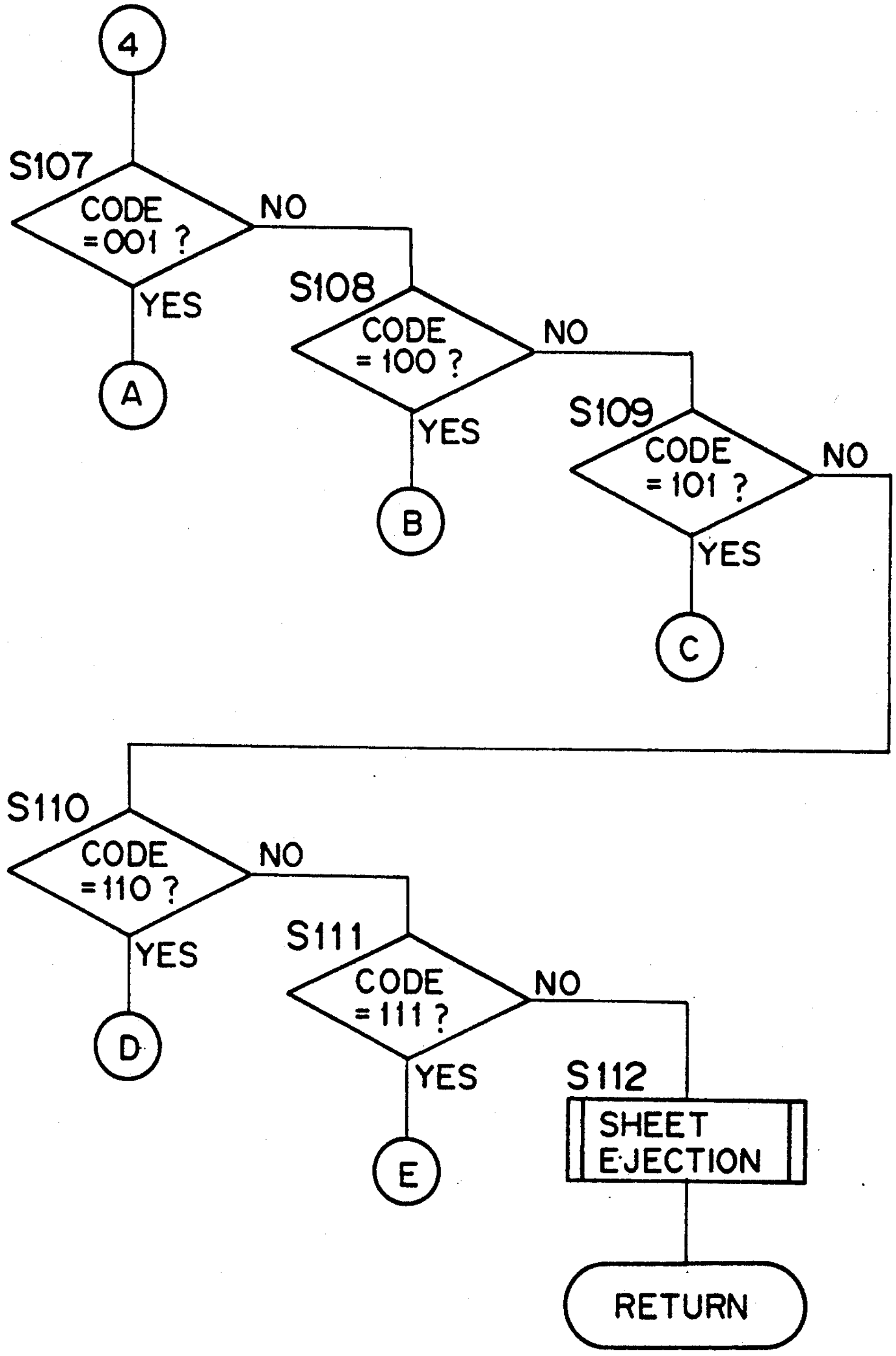
Figure 17:
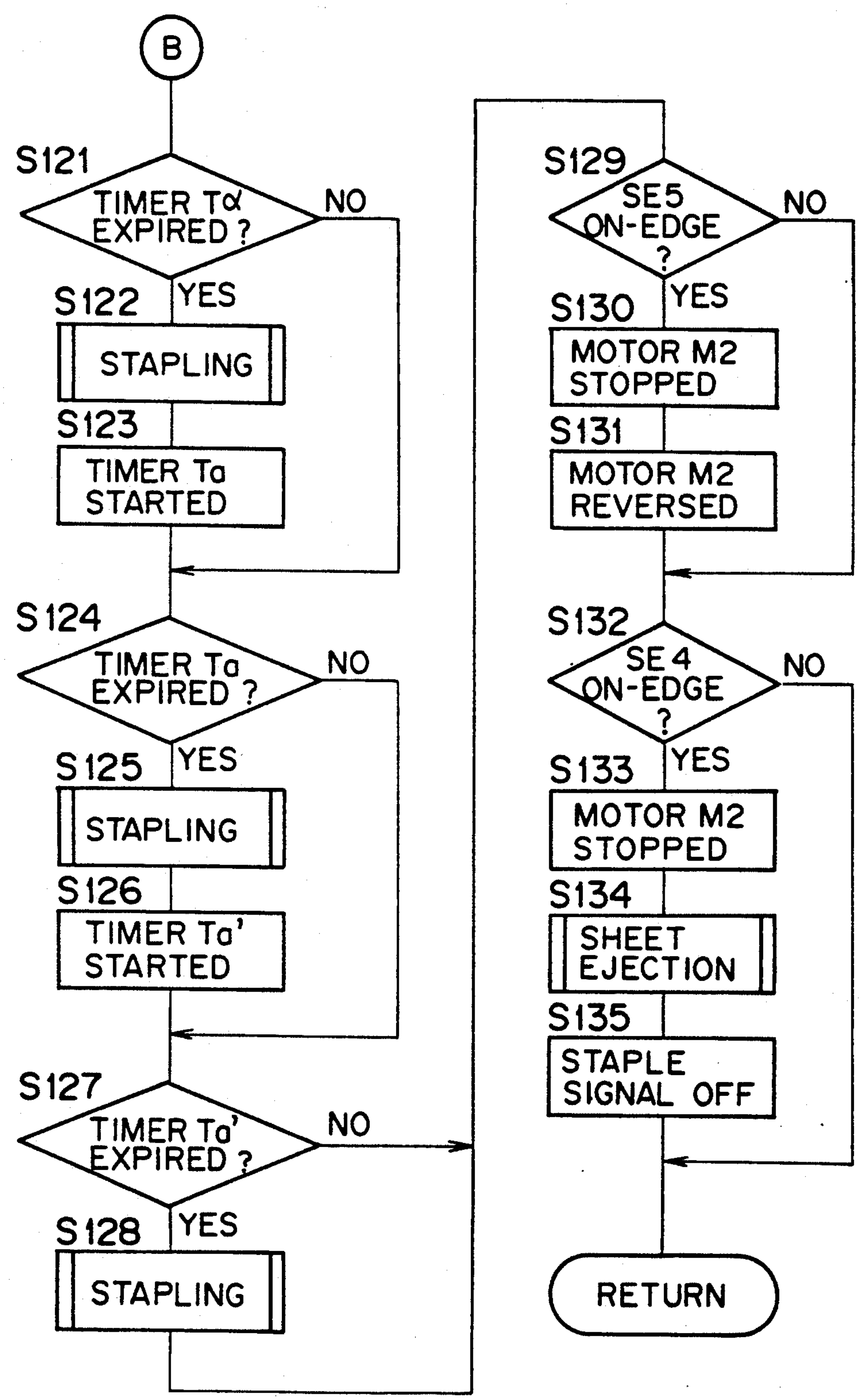

FIGS. 15, 16 and 17 show a finishing subroutine which is called at step S6 in the main routine.

It is judged at step S100 whether one of the LEDs 132 through 137 is on. If all of them are off, this subroutine is terminated immediately. If one of them is on, it is judged at step S101 whether one cycle of copying using the ADF 30 is completed, or it is judged at step S102 whether the staple start key 130 is on. If one of the judgments at steps S101 and S102 is "YES", a staple signal is turned on at step S103 so as to start the stapling.

Specifically, the motor M2 is rotated forward at step S104, and the sensor SE4 is checked at step S105. When the sensor SE4 is judged to be off-edge, a timer T $\alpha$ is started at step S106. The timer T $\alpha$ determines the rotating period of the motor M2 to move the stapler 70 by the distance $\alpha$ shown in FIGS. 4a through 4e from the detection point of the sensor SE4 (home position) to a first stapling point. While the timer T $\alpha$ is counting, the stapling code is recognized at steps S107 through S111 and the stapling is continued according to the code. If no stapling code is provided because of some trouble, sheet ejection from the staple tray 55 is carried out at step S112 such that sheets on the staple tray 55 can be left unstapled and ejected into the box 81. The ejection is made by turning on the solenoid SL1. When the solenoid SL1 is turned on, the stopper 57 opens the bottom of the tray 55, and the sheets are ejected into the box 81.

The stapling according to the code is described. For example, if the stapling code is "100" (A3 longitudinal-/A4 lateral multiple stapling mode), a routine shown in FIG. 17 is carried out.

Figure 18:
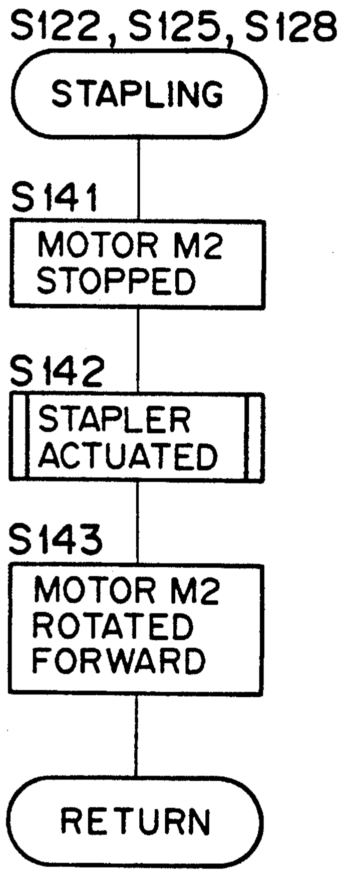
FIG. 18 is a flowchart showing a subroutine for stapling at each stapling point.

When the expiration of the timer T $\alpha$ is confirmed at step S121, that is, when the stapler 70 has moved by the distance $\alpha$, stapling with the stapler 70 is carried out at step S122. The stapling proceeds as shown in FIG. 18. The motor M2 is stopped at step S141, and the stapler 70 staples at step S142. Thereafter, the motor M2 is rotated forward to start moving the stapler 70 toward the next stapling point.

Next, a timer Ta is started at step S123. The timer Ta determines the rotating period of the motor M2 to move the stapler 70 by the distance a shown in FIG. 4a. When the expiration of the timer Ta is confirmed at step S124, the stapling with the stapler 70 is carried out at step S125. The stapling at step S125 proceeds as shown in FIG. 18. Thereafter, a timer Ta' is started at step S126. The timer Ta' determines the rotating period of the motor M2 to move the stapler 70 by the distance a' shown in FIG. 4a. When the expiration of the timer Ta' is confirmed at step S127, the stapling with the stapler 70 is carried out at step S128, and the stapling proceeds as shown in FIG. 18.

Thereafter, when the sensor SE5 is judged to be on-edge at step S129, which means that the stapler 70 has reached the terminal position, the motor M2 is stopped at step S130 and reversed at step S131. Subsequently, when the sensor SE4 is judged to be on-edge at step S132, which means that the stapler 70 has reached the home position, the motor M2 is stopped at step S134.

Next, the stapled sheets are ejected at step S134. Specifically, the stopper 57 opens the bottom of the staple tray 55, and the stapled sheets are ejected into the box 81. Then, the staple signal is turned off at step S135, and the stapling subroutine is completed.

The routine shown in FIG. 17 is to carry out stapling in the A3-longitudinal/A4-lateral multiple stapling mode (code "100"), and similar routines are provided to carry out stapling in the other stapling modes. In the B4-longitudinal/B5-lateral multiple stapling mode (code "101"), the motor M2 is controlled to move the stapler 70 by the distances $\alpha$, b and b' (see FIG. 4b). In the A4-longitudinal multiple stapling mode (code "110") or in the B5-longitudinal multiple stapling mode (code "111"), the motor M2 is controlled to move the stapler 70 by the distances $\alpha$, and c or d (see FIGS. 4c and 4d) and the processing at steps S126, S127 and S128 are omitted. In the single stapling mode (code "001"), after step S122, the processing goes directly to step S129.

Other Embodiments

Although the present invention has been described in connection with the preferred embodiment above, it is to be noted that various changes and modifications are possible to those who are skilled in the art. Such changes and modifications are to be understood as being within the scope of the present invention.

The finisher unit 50 can be made into various types. For example, the staple tray 55 can be set in the horizontal posture. It can be provided with a sorter so that sheets can be distributed among sorter bins and that the sorted sheets can be stapled in the sorter bins or transported therefrom to the staple tray 55 automatically to be stapled.

The motor M2 may be a stepping motor which is driven by pulses so that the travel of the stapler 70 can be controlled in accordance with the number of pulses.

The finisher unit 50 may be provided with more than one stapler although economically fewer is better.

In the above embodiment, the stapler 70 changes its position to staple sheets at determined one or more points. However, the finisher unit 50 may be so constituted that sheets to be stapled, not the stapler, are moved. More specifically, a movable tray may be used as the staple tray 50, or a movable sheet nipping member for nipping and moving sheets on the staple tray 50 may be provided.

Stapling modes are not limited to those mentioned in the above embodiment. Any number of stapling points can be located at any place. Concerning single stapling, it is possible to change the stapling point in accordance with the manner of the travel of sheets. For example, sheets transported to the staple tray 55 in a longitudinal manner (with their longitudinal sides parallel with the traveling direction) may be stapled at the left end, and sheets transported to the staple tray 55 in a lateral manner (with their lateral sides parallel with the traveling direction) may be stapled at the right end. The stapling may be repeated at substantially one stapling point or very slightly different points to secure the binding of sheets. In this case, the number of repetitions of the stapling at substantially one stapling point may be determined in accordance with the kind of sheets to be stapled.

Modifications are possible to the control procedure. For example, in the stapling subroutine, steps S129 and S130 shown in FIG. 17 may be omitted so that the stapler 70 will return to the home position immediately after stapling at the last stapling point.

What is claimed is:

1. A finisher for stacking sheets ejected from an image forming apparatus on a tray and stapling the sheets selectively, the finisher comprising:

means for stapling a stack of sheets on the tray, the means having at least one stapler;

means for recognizing what kind of sheets are to be stapled by the stapling means;

means for automatically locating one or more stapling points in accordance with the kind of sheets recognized by the sheet recognizing means; and means for controlling the stapling means to staple the stack of sheets at the stapling points.

2. A finisher as claimed in claim 1, wherein the stapling means comprises a driving mechanism for enabling the stapler, the tray, or alternatively the stack of sheets on the tray to change its position.

3. A finisher as claimed in claim 1, wherein the sheet recognizing means recognizes what size the sheets are, including in which manner the sheets are transported to the tray, with their longitudinal sides parallel with a direction of the sheet transportation or with their lateral sides parallel with the direction of the sheet transportation.

4. A finisher as claimed in claim 1, wherein the stapling point locating means comprises a memory which is stored with data about proper location of stapling points for each kind of sheets.

5. A finisher for stacking sheets ejected from an image forming apparatus on a tray and stapling the sheets selectively, the finisher comprising:

means for stapling a stack of sheets on the tray, the means having at least one stapler;

means for recognizing what kind of sheets are to be stapled by the stapling means;

means for automatically determining number of stapling actions in accordance with the kind of sheets recognized by the sheet recognizing means; and means for controlling the stapling means to perform the determined number of stapling actions.

6. A finisher as claimed in claim 5, wherein the determining means determines number of stapling points in accordance with the kind of sheets recognized by the sheet recognizing means.

7. A finisher as claimed in claim 6, wherein the stapling means comprises a driving mechanism for enabling the stapler, the tray, or alternatively the stack of sheets on the tray to change its position.

8. A finisher as claimed in claim 6, wherein the stapling point determining means comprises a memory which is stored with data about proper number of stapling points for each kind of sheets.

9. A finisher as claimed in claim 5, wherein the sheet recognizing means recognizes what size the sheets are, including in which manner the sheets are transported to the tray, with their longitudinal sides parallel with a direction of the sheet transportation or with their lateral sides parallel with the direction of the sheet transportation.

10. A finisher as claimed in claim 5, wherein the stapling means includes a driving mechanism for relatively moving the stapler with respect to the stack of sheets and said controlling means controls the stapling means to change its stapling position at every stapling action.

11. An image forming apparatus comprising:

means for copying a set of documents onto copy sheets;

means for detecting what size the documents are;

means for automatically selecting copy sheets which have a size in accordance with the size of the documents detected by the size detecting means;

means for stacking and storing copy sheets therein, which copy sheets have obtained images of the documents in the copying means;

means, which has at least one stapler, for stapling a stack of copy sheets in the stacking/storing means;

means for automatically locating one or more stapling points in accordance with the size of the copy sheets selected by the sheet selecting means; and means for controlling the stapling means to staple the stack of sheets at the stapling points.

12. An image forming apparatus as claimed in claim 11, wherein the stapling means comprises a driving mechanism for enabling the stapler, the stacking/storing means, or alternatively the stack of copy sheets in the stacking/storing means to change its position.

13. An image forming apparatus as claimed in claim 11, wherein:

the sheet recognizing means recognizes what size the selected sheets are, including in which manner the sheets are transported to the stacking/storing means, with their longitudinal sides parallel with a direction of the sheet transportation or with their lateral sides parallel with the direction of the sheet transportation; and the stapling point locating means determines number and location of stapling points in accordance with the sheet size recognized by the sheet recognizing means.

14. An image forming apparatus as claimed in claim 13, wherein the stapling point locating means has a memory which is stored with data about proper number and location of stapling points for each copy sheet size.

* * * * *

US005229812B1

REEXAMINATION CERTIFICATE (3732th)

United States Patent [19]

[11] B1 5,229,812

Toyama et al.

[45] Certificate Issued Feb. 16, 1999

[54] FINISHER WITH A STAPLER

[75] Inventors: Osamu Toyama, Kobe; Kadotaro Nishimori, Nagoya; Toru Okatani, Kobe; Tatsuya Tanigawa, Toyokawa, all of Japan

[73] Assignee: Minolta Camera Kabushiki Kaisha, Osaka, Japan

Reexamination Request:
No. 90/004,049, Dec. 7, 1995

Reexamination Certificate for:

| | |
|---|---|
| Patent No.: | **5,229,812** |
| Issued: | **Jul. 20, 1993** |
| Appl. No.: | **884,631** |
| Filed: | **May 15, 1992** |

[30] Foreign Application Priority Data

May 20, 1991 [JP] Japan .................................... 3-115025

[51] Int. Cl.$^{6}$ ........................... G03B 27/48; G03B 27/50; G03G 21/00

[52] U.S. Cl. .......................... 355/50; 270/58.08; 399/410

[58] Field of Search ............................ 355/50, 308, 324; 271/221, 292; 270/58.08, 37; 399/408, 410

[56] References Cited

U.S. PATENT DOCUMENTS

| | | | |
|---|---|---|---|
| 4,516,714 | 5/1985 | Braun et al. | 227/78 |
| 4,763,167 | 8/1988 | Watanabe et al. | 355/14 R |
| 4,851,883 | 7/1989 | Ito | 399/370 X |
| 4,903,952 | 2/1990 | Russel et al. | 270/53 |
| 4,988,029 | 1/1991 | Fiske | 227/5 |
| 5,005,751 | 4/1991 | Radtke et al. | 227/111 |
| 5,020,785 | 6/1991 | Kosaka et al. | 270/53 |
| 5,099,292 | 3/1992 | Hirose | 355/324 |
| 5,106,067 | 4/1992 | Higaaki | 270/53 |
| 5,183,195 | 2/1993 | Allmendinger et al. | 227/29 |

FOREIGN PATENT DOCUMENTS 63-109449 5/1988 Japan .

*Primary Examiner*—Fred L. Braun

[57] ABSTRACT

An electric stapler is disposed at the bottom of a tray on which printed sheets are stacked, and is movable along the bottom of the tray. Printed sheets are aligned on the tray along a reference line. The stapler moves along the bottom of the tray and stops at determined points to staple the aligned sheets. A control section is stored with data about the number and location of stapling points proper for each sheet size. The size of printed sheets to be stapled is detected, and the movement of the stapler is controlled so that the stapler can staple at proper points for the detected sheet size.

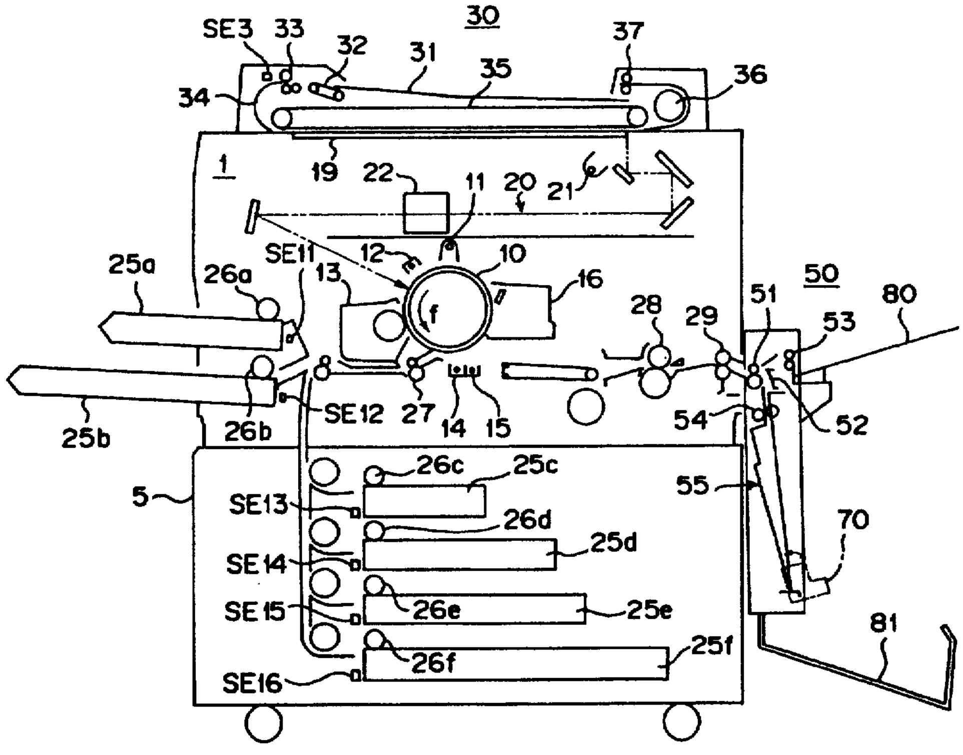

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentabilty of claims 5–12 is confirmed.

Claims 1 and 13 are determined to be patentable as amended.

Claims 2–4 and 14 dependent on an amended claim are determined to be patentable.

New claims 15 and 16 are added and determined to be patentable.

1. A finisher for stacking sheets ejected from an image forming apparatus on a tray and *for* stapling the sheets selectively, *each of the sheets having longtudinal sides and lateral sides,* the finisher comprising:

means for stapling a stack of sheets on the tray, the means having at least one stapler;

means for recognizing what kind of sheets are to be stapled by the stapling means;

means for automatically locating one or more stapling points in accordance with the kind of sheets recognized by the sheet recognizing means, *said one or more stapling points being located either (a) along one of said longitudinal sides between said lateral sides with a distance between one of said lateral sides and a first stapling point of said one or more stapling points located along said one of said longitudinal sides being changeable in accordance with the kind of the sheets to be stapled where said first stapling point is the stapling point which is nearest to said one of said lateral sides, said distance also being less than a distance between another lateral side and said first stapling point, or (b) along one of said lateral sides between said longitudinal sides with a distance between one of said longitudinal sides and a first stapling point of said one or more stapling points located along said one of said lateral sides being changeable in accordance with the kind of sheets to be stapled where the first stapling point is the stapling point which is nearest to said one of said longitudinal sides, the distance between said one of said longitudinal sides and the first stapling point of said one or more stapling points located along said one of said lateral sides also being less than a distance between another longitudinal side and the first stapling point of said one or more stapling points located along said one of said lateral sides;* and means for controlling the stapling means to staple the stack of sheets at the stapling points.

13. An image forming apparatus as claimed in claim 11, [wherein:] *further comprising:*

[the] *a* sheet recognizing means *which* recognizes what size the selected sheets are, including in which manner the sheets are transported to the stacking/storing means, with their longitudinal sides parallel with a direction of the sheet transportation or with their lateral sides parallel with the direction of the sheet transporation; [and]

*wherein* the stapling point locating means determines number and location of stapling points in accordance with the sheet size recognized by the sheet recognizing means.

*15. A finisher as claimed in claim 1, wherein said one or more stapling points comprises one stapling point.*

*16. A finisher as claimed in claim 1, wherein said one or more stapling points comprises at least two stapling points.*

* * * * *